United States Patent
Liu et al.

(10) Patent No.: US 11,235,406 B2
(45) Date of Patent: Feb. 1, 2022

(54) HIGH-EFFICIENCY SOLDERING APPARATUS FOR WINDING HEAD OF FLAT-WIRE MOTOR AND SOLDERING PROCESS

(71) Applicant: HEFEI JEE POWER SYSTEMS Co., Ltd., Anhui (CN)

(72) Inventors: Lei Liu, Anhui (CN); Biaolong Zhu, Anhui (CN); Wenming Ma, Anhui (CN); Chunzhe Sun, Anhui (CN); Xu Tian, Anhui (CN)

(73) Assignee: HEFEI JEE POWER SYSTEMS Co., Ltd., Anhui (CN)

( * ) Notice: Subject to any disclaimer, the term of this patent is extended or adjusted under 35 U.S.C. 154(b) by 0 days.

(21) Appl. No.: 16/959,167

(22) PCT Filed: Dec. 30, 2019

(86) PCT No.: PCT/CN2019/129702
§ 371 (c)(1),
(2) Date: Jun. 30, 2020

(87) PCT Pub. No.: WO2020/151459
PCT Pub. Date: Jul. 30, 2020

(65) Prior Publication Data
US 2021/0220936 A1 Jul. 22, 2021

(30) Foreign Application Priority Data
Jan. 24, 2019 (CN) .......................... 201910067209.2

(51) Int. Cl.
*B23K 1/00* (2006.01)
*B23K 3/00* (2006.01)
(Continued)

(52) U.S. Cl.
CPC .............. *B23K 3/0669* (2013.01); *B23K 1/08* (2013.01); *B23K 1/203* (2013.01); *H02K 3/50* (2013.01); *H02K 15/0062* (2013.01)

(58) Field of Classification Search
CPC ........ B23K 3/0669; B23K 1/08; B23K 1/203; B23K 3/082; B23K 1/00–206;
(Continued)

(56) References Cited

U.S. PATENT DOCUMENTS

| 1,717,038 A | * | 6/1929 | Karmazin | ................. F28F 1/28 |
| | | | | 29/890.039 |
| 3,815,806 A | * | 6/1974 | Paxton | ................. B23K 3/0646 |
| | | | | 228/19 |

(Continued)

FOREIGN PATENT DOCUMENTS

| CN | 201500841 U | 6/2010 |
| CN | 203843339 U | 9/2014 |

(Continued)

*Primary Examiner* — Kiley S Stoner
(74) *Attorney, Agent, or Firm* — Craft Chu PLLC; Andrew W. Chu (57) ABSTRACT

The high-efficiency soldering apparatus for a winding head of a flat-wire motor includes a support base, a solder tray, a solder spot isolation and limit plate, a shaft lever and a movable tray. The solder tray is provided at the center of the support base. The solder spot isolation and limit plate is provided on the solder tray. The shaft lever is provided on the support base. The movable tray is provided on the shaft lever. The movable tray is located above the solder tray. The movable tray moves vertically along the shaft lever. A stator is placed at the center of the movable tray, and a winding head of the stator extends below the movable tray.

7 Claims, 6 Drawing Sheets

(51) Int. Cl.
*B23K 3/06* (2006.01)
*B23K 1/08* (2006.01)
*B23K 1/20* (2006.01)
*H02K 3/50* (2006.01)
*H02K 15/00* (2006.01)

(58) Field of Classification Search
CPC ...... B23K 3/00–087; B23K 37/04–047; H02K 3/50; H02K 15/0062; H02K 15/0087
USPC ............. 228/245–262, 179.1–180.22, 33–40
See application file for complete search history.

(56) References Cited

U.S. PATENT DOCUMENTS

| | | | | | |
|---|---|---|---|---|---|
| 3,828,419 | A | * | 8/1974 | Wanner | B23K 3/0676 |
| | | | | | 228/36 |
| 3,834,015 | A | * | 9/1974 | Di Renzo | H05K 3/3447 |
| | | | | | 29/843 |
| 3,920,176 | A | * | 11/1975 | Becker | F28F 9/268 |
| | | | | | 228/183 |
| 4,869,418 | A | * | 9/1989 | Simpson | B23K 1/08 |
| | | | | | 228/37 |
| 5,711,473 | A | * | 1/1998 | Sund | B23K 1/012 |
| | | | | | 228/180.1 |
| 5,860,582 | A | * | 1/1999 | Sund | B23K 3/0669 |
| | | | | | 228/6.2 |
| 5,890,283 | A | * | 4/1999 | Sakemi | H01L 21/67144 |
| | | | | | 29/840 |
| 6,705,506 | B1 | * | 3/2004 | Sund | B23K 1/08 |
| | | | | | 228/42 |
| 2001/0022316 | A1 | * | 9/2001 | Matsudome | B23K 1/0016 |
| | | | | | 228/248.1 |
| 2003/0209585 | A1 | * | 11/2003 | Katayama | B23K 1/14 |
| | | | | | 228/41 |
| 2004/0129765 | A1 | * | 7/2004 | Lee | H05K 1/0263 |
| | | | | | 228/259 |
| 2006/0054667 | A1 | * | 3/2006 | Onozaki | B23K 3/0623 |
| | | | | | 228/259 |
| 2009/0250504 | A1 | * | 10/2009 | Chang | B23K 1/0016 |
| | | | | | 228/36 |
| 2010/0314433 | A1 | * | 12/2010 | Healy | H01L 21/6835 |
| | | | | | 228/259 |
| 2012/0104074 | A1 | * | 5/2012 | Lyu | H01L 24/75 |
| | | | | | 228/8 |
| 2017/0170705 | A1 | * | 6/2017 | Yamakawa | H02K 1/146 |
| 2018/0117695 | A1 | * | 5/2018 | Buergi | B23K 1/203 |

FOREIGN PATENT DOCUMENTS

| | | | | |
|---|---|---|---|---|
| CN | 204148681 U | | 2/2015 | |
| CN | 206794970 U | | 12/2017 | |
| CN | 207753587 U | | 8/2018 | |
| CN | 109623080 A | | 4/2019 | |
| CN | 209811401 U | | 12/2019 | |
| DE | 2541768 A1 | * | 3/1977 | ........... H05K 3/3485 |
| DE | 102008047114 A1 | * | 4/2010 | ........... B23K 3/0669 |
| DE | 102008047115 A1 | * | 4/2010 | ................ B23K 1/08 |
| GB | 825297 A | * | 12/1959 | ........... B23K 3/0669 |
| JP | 54100955 A | * | 8/1979 | ........... B23K 3/0646 |
| JP | 58209471 A | * | 12/1983 | ........... B23K 3/0646 |
| JP | 60068155 A | * | 4/1985 | ................ B23K 1/08 |
| JP | 63137571 A | * | 6/1988 | ........... B23K 3/0676 |
| JP | H0236520 A | | 2/1990 | |
| JP | 04075776 A | * | 3/1992 | |
| JP | 06226444 A | * | 8/1994 | |

* cited by examiner

HIGH-EFFICIENCY SOLDERING APPARATUS FOR WINDING HEAD OF FLAT-WIRE MOTOR AND SOLDERING PROCESS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a soldering apparatus for a winding head of a stator of a vehicle drive motor or a generator and a soldering process.

2. Description of Related Art Including Information Disclosed Under 37 CFR 1.97 and 37 CFR 1.98

In the formation of a winding of a stator of a flat-wire motor, a formed hair-pin coil or single-sided coil is first inserted in a slot in a stator iron core, a bending die is then used to bend an opening end of the coil, and bent adjacent conductors are soldered to implement the electrical connection of the winding. Existing welding manners mainly include laser beam welding or argon arc welding. In both the methods, copper is molten at an instantaneous high temperature to form a welding spot, so as to implement the electrical connection of a winding. However, the prior art mainly has two disadvantages. First, a high temperature needs to be instantaneously generated to melt copper in laser beam welding or argon arc welding, and enamel films of enamel wires around the welding spot are prone to damage, resulting in reduced insulation reliability. Second, a large number of hair-pin coils or single-sided coils form a winding of a stator of a flat-wire motor, and a large number of welding spots are needed. In laser beam welding or argon arc welding, welding is usually performed at welding spots one by one, and the production efficiency of a flat-wire stator is severely affected.

BRIEF SUMMARY OF THE INVENTION

An objective of the present disclosure is to provide a soldering apparatus mainly for a winding of a stator of a flat-wire motor and a high-efficiency soldering process. In the soldering process, a winding head of a stator is dipped in a molten solder to complete the soldering of all the solder spots once, thereby improving the production efficiency and quality.

A technical solution of the present disclosure is a high-efficiency soldering apparatus for a winding head of a flat-wire motor, wherein the soldering apparatus includes a support base, a solder tray, a solder spot isolation and limit plate, a shaft lever and a movable tray; the solder tray is provided at the center of the support base; the solder spot isolation and limit plate is provided on the solder tray; the shaft lever is provided on the support base; the movable tray is provided on the shaft lever; the movable tray is located above the solder tray; the movable tray moves vertically along the shaft lever; and a stator is placed at the center of the movable tray, and a winding head of the stator extends below the movable tray.

Preferably, the solder spot isolation and limit plate is provided with threaded holes, and screws pass through the threaded holes to fix the solder spot isolation and limit plate on the solder tray.

Preferably, the solder spot isolation and limit plate is provided with solder spot isolation and limit through holes, and the solder spot isolation and limit through holes are evenly distributed in a ring.

Preferably, the solder tray is provided with an annular solder slot.

Preferably, there are four shaft levers.

Preferably, the shaft lever is a smooth shaft lever.

Preferably, the solder tray is provided with a threaded fixing hole, and the solder tray is connected to the support base by a screw passing through the threaded fixing hole.

A soldering process using the high-efficiency soldering apparatus for a winding head of a flat-wire motor, wherein specific process steps include:

(1) melting a solder: placing the solder in the solder tray, and enabling the solder to reach and stay in a molten state;

(2) applying a flux: before the stator is placed on the movable tray, applying the flux to the winding head to be dip soldered of the stator or dipping the winding head in the flux in advance;

(3) placing the stator: placing the stator applied or dipped with the flux on the movable tray, with the winding head of the stator extending below the movable tray;

(4) performing dip soldering: moving the movable tray downward along the shaft lever, partially dipping the winding head of the stator in the solder tray holding the molten solder, and performing dip soldering by using the solder spot isolation and limit plate; and (5) performing resetting: after moving the movable tray downward to reach the position to finish the dip soldering, moving the movable tray on which the stator is placed upward along the shaft lever to return to an initial position, thereby completing the soldering process.

The advantages of the present disclosure are as follows.

1. The soldering apparatus of the present disclosure has a compact and appropriate structure and requires simple operations.

2. The design of the solder spot isolation and limit plate can facilitate the soldering of adjacent conductors and can also ensure that adjacent solder spots are not stuck together, thereby improving the production efficiency.

3. The soldering of all the solder spots can be completed by performing the soldering process once, so that the production efficiency is high.

BRIEF DESCRIPTION OF THE SEVERAL VIEWS OF THE DRAWINGS

The present disclosure is further described below with reference to the accompanying drawings and embodiments.

DETAILED DESCRIPTION OF THE INVENTION

Embodiment

Figure 1:
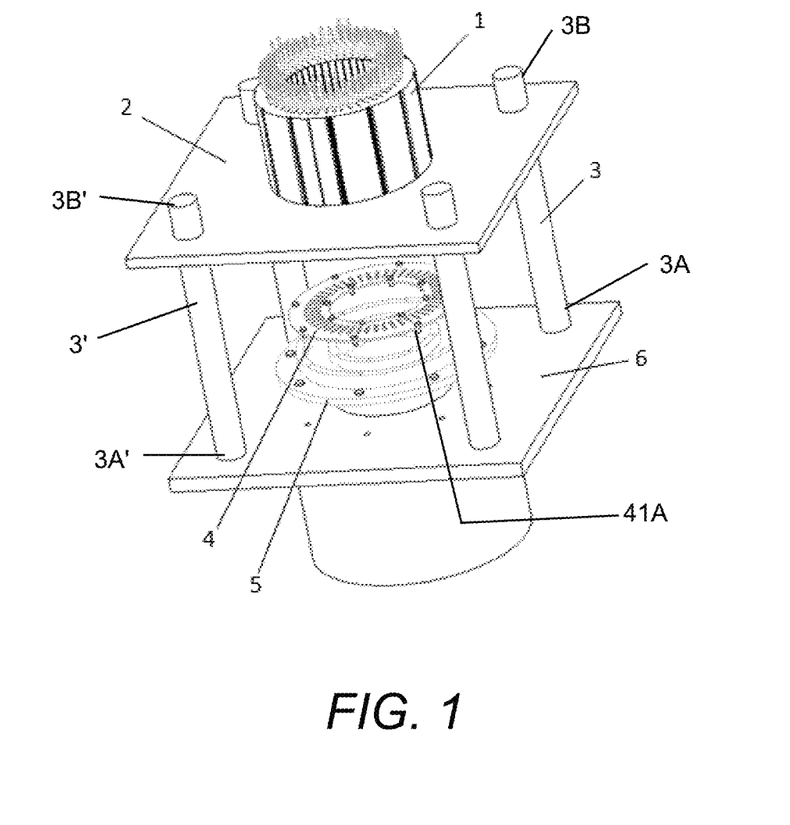
FIG. 1 is a three-dimensional schematic structural diagram of a high-efficiency soldering apparatus for a winding head of a flat-wire motor according to the present disclosure.
Figure 2:
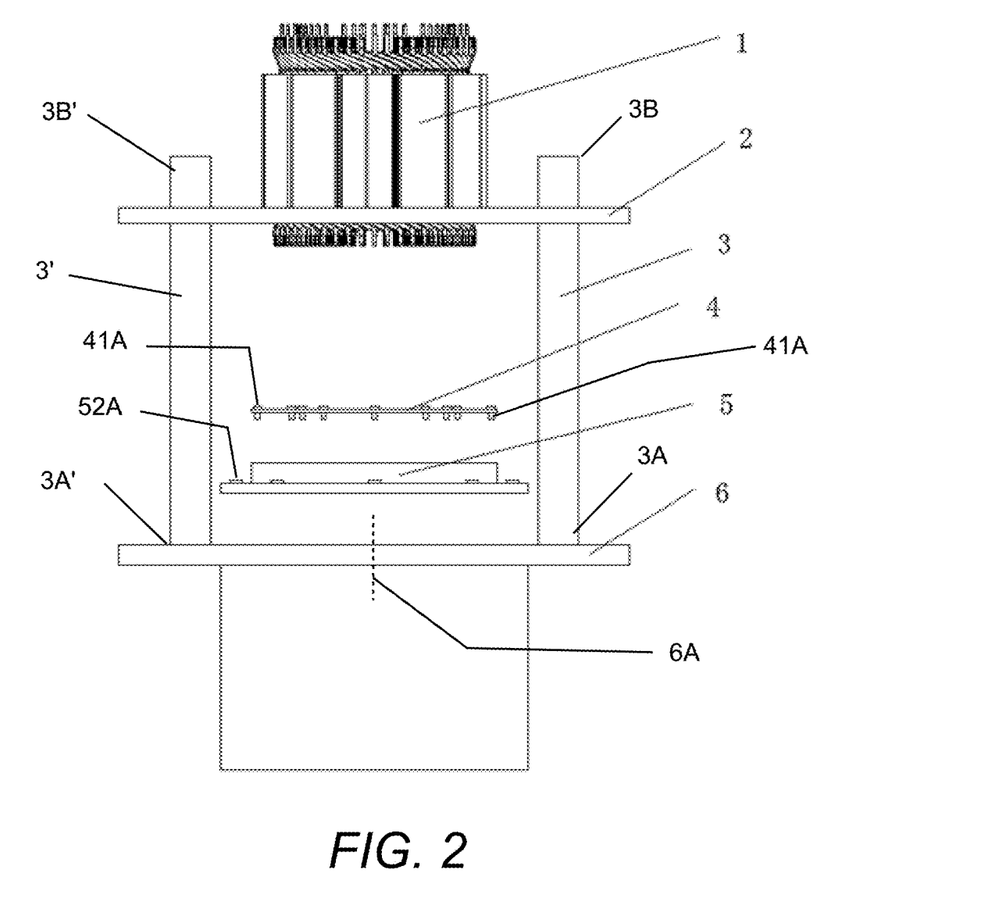
FIG. 2 is a schematic structural front view of a high-efficiency soldering apparatus for a winding head of a flat-wire motor according to the present disclosure.
Figure 3:
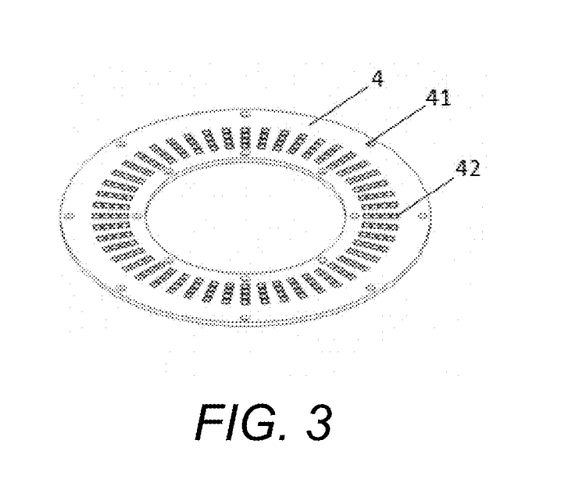
FIG. 3 is a schematic structural view of a solder spot isolation and limit plate of a high-efficiency soldering apparatus for a winding head of a flat-wire motor according to the present disclosure.
Figure 4:
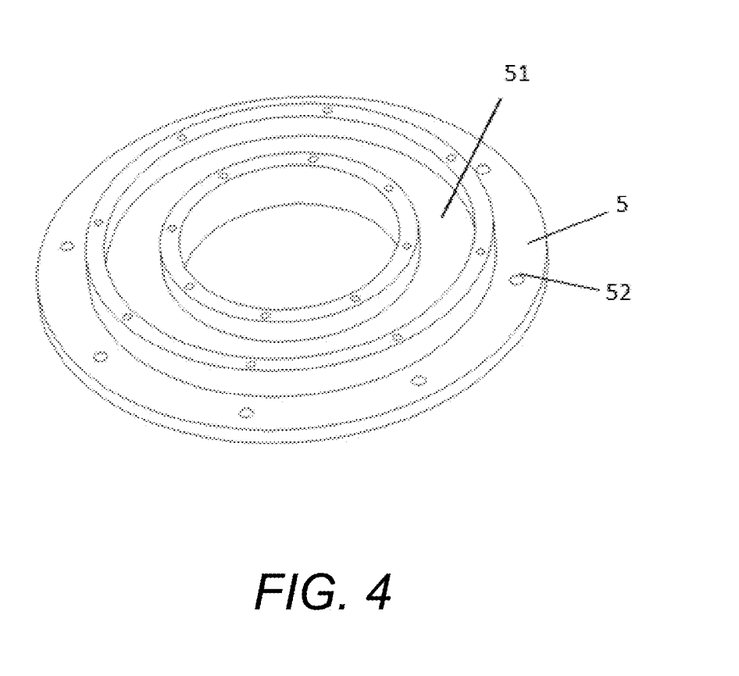
FIG. 4 is a schematic structural view of a solder tray of a high-efficiency soldering apparatus for a winding head of a flat-wire motor according to the present disclosure.
Figure 5:
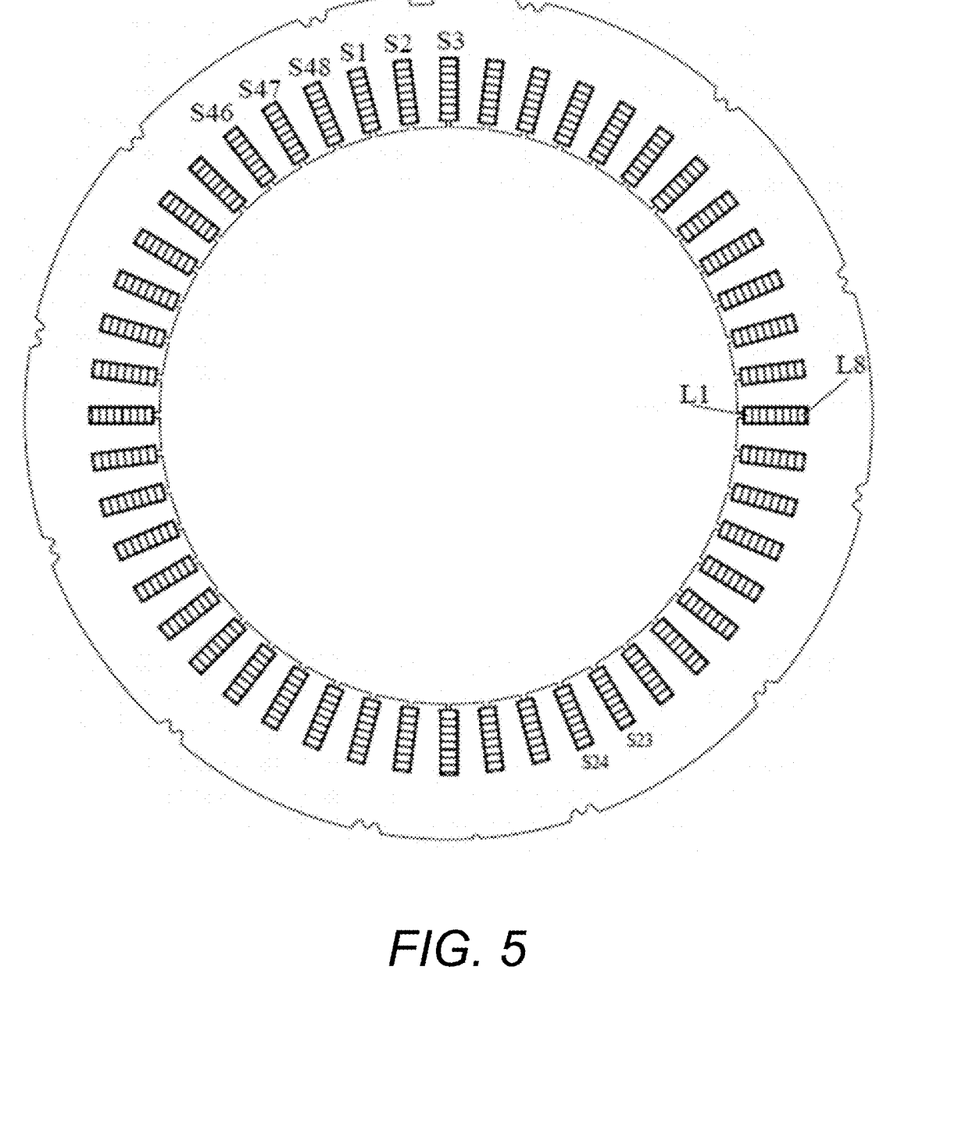
FIG. 5 is a schematic diagram of an iron core slot number and a layer number of an 8-pole 48-slot flat-wire motor stator of a high-efficiency soldering apparatus for a winding head of a flat-wire motor according to the present disclosure.
Figure 6:
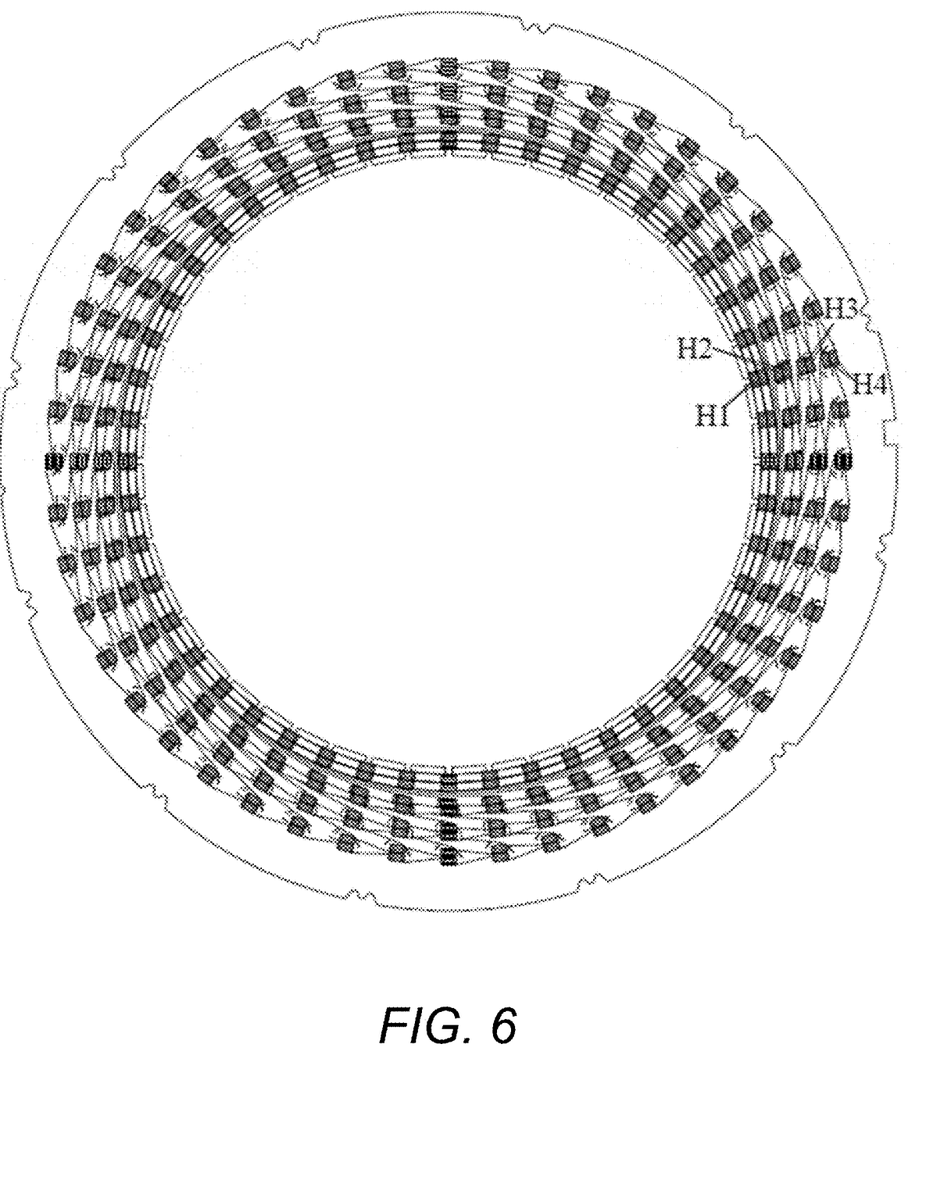
FIG. 6 is a schematic diagram of solder spots of a winding head of an 8-pole 48-slot flat-wire motor stator of a high-efficiency soldering apparatus for a winding head of a flat-wire motor according to the present disclosure, Where: 1. 8-pole 48-slot flat-wire motor stator; 2. movable tray; 3. shaft lever; 4. solder spot isolation and limit plate; 5. solder tray; 6. support base; 41. threaded hole; 42. solder spot isolation and limit through hole; 51. annular solder slot; and 52. threaded fixing hole.

As shown in FIG. 1 to FIG. 4, a high-efficiency soldering apparatus for a winding head of a flat-wire motor is described by using an 8-pole 48-slot flat-wire motor stator 1 as an example. The soldering apparatus includes a support base 6, a solder tray 5, a solder spot isolation and limit plate 4, a shaft lever 3 and a movable tray 2. The solder tray 5 is provided at the center (support base center 6A) of the support base 6. The solder tray 5 is provided with an annular solder slot 51. The solder tray is provided with a threaded fixing hole 52. The solder tray 5 is connected to the support base 6 by a screw (solder tray screw 52A) passing through the threaded fixing hole 52. The solder spot isolation and limit plate 4 is provided on the solder tray 5. The shaft lever 3 (having one shaft lever end 3A and an opposite shaft lever end 3B) is provided on the support base 6 (one shaft lever end 3A). The movable tray 2 is provided on the shaft lever 3 (opposite shaft lever end 3B). There are four shaft levers 3 (at least another shaft lever 3' with another one shaft lever end 3A' and another opposite shaft lever end 3B') respectively distributed at four corners of the support base 6. The shaft lever 3 is a smooth shaft lever. The movable tray 2 is located above the solder tray 5. The movable tray 2 moves vertically along the shaft lever 3. The 8-pole 48-slot flat-wire motor stator 1 is placed at the center of the movable tray 2, and a non-outlet terminal of a winding head of the stator extends below the movable tray 2. As shown in FIG. 5 and FIG. 6, iron core slot numbers of the 8-pole 48-slot flat-wire motor stator 1 are sequentially labeled as S1, S2, . . . , S47, and S48 in a clockwise direction. Each slot has eight conductors. Layer numbers of the conductors in the slot are sequentially named L1, L2, . . . , L7, and L8 in a radial direction away from the center of circle. A winding of the 8-pole 48-slot flat-wire motor stator 1 is formed by a plurality of single-sided coils. Two ends of the single-sided coils are soldered to implement the electrical connection of the winding. Solder spots at the non-outlet terminal of the winding head of the stator are evenly distributed in a circumferential direction. The solder spots are sequentially named H1, H2, H3, and H4 in the radial direction away from the center of circle. The conductor layers L1 and L2 in the slot form the solder spot H1, L3 and L4 form the solder spot H2, L5 and L6 form the solder spot H3, and L7 and L8 form the solder spot H4. The solder spot isolation and limit plate 4 is provided with threaded holes 41. Screws (solder spot isolation and limit plate screws 41A) pass through the threaded holes 41 to fix the solder spot isolation and limit plate 4 on the solder tray 5. The solder spot isolation and limit plate 4 is provided with solder spot isolation and limit through holes 42. The solder spot isolation and limit through holes 42 are evenly distributed in a ring. The positions of the solder spot isolation and limit through holes correspond to those of the solder spots of the winding of the stator. There are a total of four ring, with each ring having 48 solder spot isolation and limit through holes The structure of the solder spot isolation and limit plate in this solution is not limited to the structure in the schematic diagram herein. The arrangement positions, layer numbers, and quantity of the isolation and limit through holes of the solder spot isolation and limit plate depend on the design positions, layer numbers, and quantity of connection solder spots of a flat-wire winding head.

A soldering process using the high-efficiency soldering apparatus for a winding head of a flat-wire motor, wherein specific process steps include:

melting a solder and placing the solder (molten solder) in the annular solder slot 51 of the solder tray 5, and enabling the solder to reach and stay in a molten state;

applying a flux: applying the flux to the winding head to be dip soldered of the 8-pole 48-slot flat-wire motor stator 1 or dipping the winding head in the flux in advance;

placing the stator: placing the 8-pole 48-slot flat-wire motor stator 1 with the winding head applied or dipped with the flux on the movable tray, with the winding head of the stator extending below the movable tray 2;

moving the movable tray 2 downward along the shaft lever 3, partially dipping the winding head of the stator in the annular solder slot 51 of the solder tray 5 holding the molten solder, and performing dip soldering by using the solder spot isolation and limit plate, wherein the solder spot isolation and limit through holes 42 are used to limit the positions of adjacent conductors to be soldered and isolate adjacent solder spots, so that it is easier to solder adjacent conductors and it can be ensured that adjacent solder spots are not stuck together.

after moving the movable tray 2 downward to reach the position to finish the dip soldering, moving the movable tray 2 on which the 8-pole 48-slot flat-wire motor stator 1 is placed upward along the shaft lever to return to the initial position, thereby completing the soldering process.

The soldering process in this solution have relatively high requirements for the melting point, adhesive property, and electrical conductivity of the solder, and an appropriate copper-based brazing filler metal or silver-based brazing filler metal may be chosen. The soldering process is applicable to a hair-pin flat-wire winding stator and an I-pin soldered flat-wire winding stator.

The principle and effect of the present disclosure are only schematically described in the foregoing embodiments, and these embodiments are not used to limit the present disclosure. Any person skilled in the art may make modifications or changes to the foregoing embodiments without departing from the spirit and scope of the present disclosure. Therefore, all equivalent modifications or changes completed by a person of ordinary skill in the technical field without departing from the spirit and technical concept disclosed in the present disclosure shall still fall within the claims of the present disclosure.

The invention claimed is:

1. A soldering apparatus, comprising:
a support base, having a support base center;
a solder tray, being positioned at said support base center and being comprised of an annular solder slot and a threaded fixing hole, said solder tray being fixed in position on said support base through said threaded fixing hole;
a solder spot isolation and limit plate, being on said solder tray and being comprised of a plurality of threaded holes and a plurality of solder spot isolation and limit through holes, said solder spot isolation and limit plate being positioned on said solder tray through said threaded holes so as to position said solder spot isolation and limit through holes over said annular solder slot;
a movable tray above said support base; and
a shaft lever, being between said movable tray and said support base and having one shaft lever end on said support base and an opposite shaft lever end on said movable tray,
wherein said movable tray is movable vertically along said shaft lever so as to dip a winding head of a stator extended below said movable tray through said solder spot isolation and limit through holes and into said annular solder slot with said solder spot isolation and limit plate being fixed in position on said solder tray.

2. The soldering apparatus according to claim 1, further comprising:
solder spot isolation and limit plate screws in threaded engagement with said solder tray through said threaded holes.

3. The soldering apparatus according to claim 1, wherein said solder spot isolation and limit through holes are evenly distributed in a ring according to said annular solder slot.

4. The soldering apparatus according to claim 1, further comprising:
another shaft lever being between said movable tray and said support base and having another one shaft lever end on said support base and another opposite shaft lever end on said shaft lever,
wherein said movable tray is movable vertically along said another shaft lever corresponding to said movable tray being movable vertically along said shaft lever.

5. The soldering apparatus according to claim 1, wherein said shaft lever and said another shaft lever are evenly distributed around said solder tray.

6. The soldering apparatus according to claim 1, further comprising:
a solder tray screw in threaded engagement with said support base through said threaded fixing hole.

7. A soldering process comprising the steps of:
melting a solder with said soldering apparatus of claim 1 so as to form a molten solder;
placing and maintaining said molten solder in said annular solder slot of said solder tray;
applying a flux to a winding head of a stator to be dip soldered;
placing the stator on said movable tray, said winding head extending below said movable tray;
moving said movable tray downward along said shaft lever from an initial position above said support base;
passing said winding head of the stator through said solder spot isolation and limit through holes of said solder spot isolation and limit plate by said shaft lever between said movable tray and said support base and into said molten solder within said annular solder slot of said solder tray so as to dip solder said winding head, said solder spot isolation and limit plate being fixed in position on said solder tray above said molten solder; and
moving said movable tray upward along said shaft lever to return to an initial position so as to complete a soldering process.

\* \* \* \* \*